United States Patent
Morise

(10) Patent No.: US 11,098,799 B2
(45) Date of Patent: Aug. 24, 2021

(54) PARKING LOCK DEVICE

(71) Applicant: TOYOTA JIDOSHA KABUSHIKI KAISHA, Toyota (JP)

(72) Inventor: Masaru Morise, Nukata-gun (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 73 days.

(21) Appl. No.: 16/680,680

(22) Filed: Nov. 12, 2019

(65) Prior Publication Data

US 2020/0166133 A1 May 28, 2020

(30) Foreign Application Priority Data

Nov. 28, 2018 (JP) .............................. JP2018-221877

(51) Int. Cl.
*F16H 63/34* (2006.01)
*B60T 1/00* (2006.01)

(52) U.S. Cl.
CPC .......... *F16H 63/3475* (2013.01); *B60T 1/005* (2013.01)

(58) Field of Classification Search
CPC ............. F16H 63/3475; F16H 63/3425; F16H 63/3433; F16H 25/186; B60T 1/005; B60T 1/062; F16D 63/006
See application file for complete search history.

(56) References Cited

U.S. PATENT DOCUMENTS

| 9,242,623 B2 * | 1/2016 | Burgardt | F16H 63/3416 |
| 2010/0108460 A1 * | 5/2010 | Nakamura | F16H 63/3416 |
| | | | 192/219.5 |
| 2014/0060994 A1 * | 3/2014 | Burgardt | F16H 63/3466 |
| | | | 192/219.6 |
| 2014/0216885 A1 * | 8/2014 | Heuver | F16H 63/3425 |
| | | | 192/219.4 |
| 2014/0346004 A1 | 11/2014 | Landino et al. | |

FOREIGN PATENT DOCUMENTS

| CN | 202349192 U | 7/2012 |
| CN | 104179968 A | 12/2014 |
| CN | 104776220 A | 7/2015 |
| JP | 2017-122483 A | 7/2017 |
| JP | 2018-059562 A | 4/2018 |
| JP | 2018-112238 A | 7/2018 |
| WO | 2009/047520 A2 | 4/2009 |

* cited by examiner

*Primary Examiner* — Charles A Fox
*Assistant Examiner* — Lori Wu
(74) *Attorney, Agent, or Firm* — Oliff PLC

(57) ABSTRACT

A parking lock device includes a parking gear, a parking pawl, a parking cam, a solenoid actuator, and a power conversion mechanism. The power conversion mechanism is configured to convert reciprocal motion of the plunger to rotary motion of the parking cam in one direction. When the parking cam rotates, a position of a cam surface of the parking cam that abuts the parking pawl is changed, so as to alternately switch between a locked position where rotation of the parking gear is stopped and an unlocked position where meshing between the parking gear and the parking pawl is canceled. A stroke amount of the plunger is reduced in a range where the parking cam can rotate. In this way, the parking lock device can be downsized. Therefore, mountability of the parking lock device on a vehicle is improved.

6 Claims, 4 Drawing Sheets

PARKING LOCK DEVICE

CROSS-REFERENCE TO RELATED APPLICATIONS

This application claims priority to Japanese Patent Application No. 2018-221877 filed on Nov. 28, 2018, which is incorporated herein by reference in its entirety.

BACKGROUND

1. Technical Field

The disclosure relates to a parking lock device provided in a vehicle and, in particular, to downsizing of the device.

2. Description of Related Art

There has been known a parking lock device that is provided in a vehicle and stops the vehicle by causing a parking gear, which is coupled to drive wheels in a manner capable of transmitting power, and a parking pawl to mesh with each other at the time when a shift operation position is switched to a parking position as a vehicle stop position. A parking lock device disclosed in Japanese Patent Application Publication No. 2018-59562 (JP 2018-59562 A) is an example of such a parking lock device. The parking lock device disclosed in JP 2018-59562 A is configured to cause translational motion of a cam, which abuts the parking pawl, by a solenoid actuator, so as to switch a position of the parking pawl between a locked position and an unlocked position.

SUMMARY

By the way, like the parking lock device disclosed in JP 2018-59562 A, in a structure of switching the position of the parking pawl between the locked position and the unlocked position by causing the translational motion of the cam, a large stroke amount is required for movement of the cam, and size of the actuator is increased to generate the large stroke amount. As a result, such a problem occurs that the device is enlarged, and mount ability of the device is thereby degraded.

The disclosure provides a parking lock device that is provided in a vehicle and has a structure capable of improving mount ability of the device by suppressing enlargement of the device.

An aspect of the disclosure relates to a parking lock device that includes a parking gear, a parking pawl, a parking cam, a solenoid actuator, and a power conversion mechanism. The parking pawl includes a meshing projection portion capable of meshing with the parking gear. The parking cam is configured to be rotatable and includes a cam surface which abuts the parking pawl on an outer circumferential portion of the parking cam. The solenoid actuator includes a solenoid and a plunger and is configured to cause reciprocal motion of the plunger by energizing the solenoid. The power conversion mechanism is configured to convert reciprocal motion of the plunger to rotary motion of the parking cam in one direction. The parking lock device is configured to be switchable between a locked position and an unlocked position. Here, at the locked position, the parking gear and the meshing projection portion of the parking pawl mesh with each other, and rotation of the parking gear is thereby stopped. At the unlocked position, meshing between the parking gear and the meshing projection portion of the parking pawl is canceled. The parking lock device is configured to change a position of the cam surface, which abuts the parking pawl, when the parking cam rotates and to be able to alternately switch the parking pawl between the locked position and the unlocked position according to the position of the cam surface, which abuts the parking pawl.

According to the parking lock device of the above aspect, the reciprocal motion of the plunger is converted to the rotation of the parking cam in the one direction via the power conversion mechanism, and, when the parking cam rotates in the one direction, the position of the cam surface of the parking cam, which abuts the parking pawl, is changed to alternately switch the parking pawl between the locked position and the unlocked position. Accordingly, a stroke amount of the plunger is reduced in a range where the parking cam can rotate. In this way, the parking lock device can be downsized. Therefore, mount ability of the parking lock device on a vehicle is improved.

In the parking lock device of the above aspect, the power conversion mechanism may include a cam member and a projection. Here, the cam member may be configured to reciprocate and be rotatable in an interlocking manner with the plunger. The projection may be projected toward the cam member from a sleeve that accommodates the cam member. In addition, the cam member may be provided with a cam groove that is engaged with the projection. The cam groove may be provided with an inclined surface that causes rotation of the cam member in one direction when the cam member abuts the projection in conjunction with the reciprocal motion of the cam member.

According to the parking lock device of the above aspect, when the plunger reciprocates, the inclined surface provided in the cam groove of the cam member abuts the projection, and the cam member rotates in the one direction by a reaction force generated in an abutment portion between the inclined surface of the cam groove and the projection. Accordingly, the reciprocal motion of the plunger can be converted to the rotation of the cam member in the one direction.

In the parking lock device of the above aspect, the cam surface of the parking cam may alternately be provided with first surfaces and second surfaces in a circumferential direction. Each of the first surfaces may be configured that the parking gear and the meshing projection portion of the parking pawl mesh with each other in a state where the parking pawl abuts the first surface. Each of the second surfaces may be configured that the meshing between the parking gear and the meshing projection portion of the parking pawl is canceled in a state where the parking pawl abuts the second surface.

In the parking lock device according to the above aspect, the cam surface of the parking cam is alternately provided with the first surfaces and the second surfaces in the circumferential direction. Thus, when the parking cam rotates in the one direction, the parking pawl can alternately be switched between the locked position and the unlocked position.

The parking lock device of the above aspect may include a one-way clutch configured to inhibit rotation of the parking cam in a reverse rotational direction of the parking cam. In addition, the parking lock device of the above aspect may further include a cam fixing mechanism configured to urge the parking cam in the reverse direction of the parking cam in a state where the solenoid is not energized.

According to the parking lock device of the above aspect, since the rotation of the parking cam in the reverse rotational direction is inhibited by the one-way clutch and the cam fixing mechanism urges the parking cam in the reverse rotational direction, the rotation of the parking cam in the state where the solenoid is not energized can be suppressed.

In the parking lock device of the above aspect, the cam fixing mechanism may include a cam fixing plunger and a spring. Here, the cam fixing plunger may be configured to abut the cam surface of the parking cam. In addition, the spring may be configured to urge the cam fixing plunger to the cam surface. Alternatively, the cam fixing mechanism may include the cam fixing plunger, the spring, and further a solenoid. Here, the cam fixing plunger may be configured to abut the cam surface of the parking cam. In addition, the spring may be configured to urge the cam fixing plunger toward the parking cam.

In the parking lock device of the above aspect, the cam fixing mechanism may include a cam fixing plunger, a spring, and a solenoid. Here, the cam fixing plunger may be configured to abut the cam surface of the parking cam. The spring may be configured to urge the cam fixing plunger toward the parking cam. And the solenoid may be configured to cause the cam fixing plunger to move in a direction away from the parking cam against the urging force of the spring when the solenoid is energized.

The parking lock device according to the aspect of the disclosure exerts such effects that the parking lock device can be downsized and that the mount ability of the parking lock device on the vehicle is improved.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

A detailed description will hereinafter be made on an embodiment of the disclosure with reference to the accompanying drawings. In the following description, the drawings are appropriately simplified or modified, and thus a dimension ratio, a shape, and the like of each portion may not be shown accurately.

Figure 1:
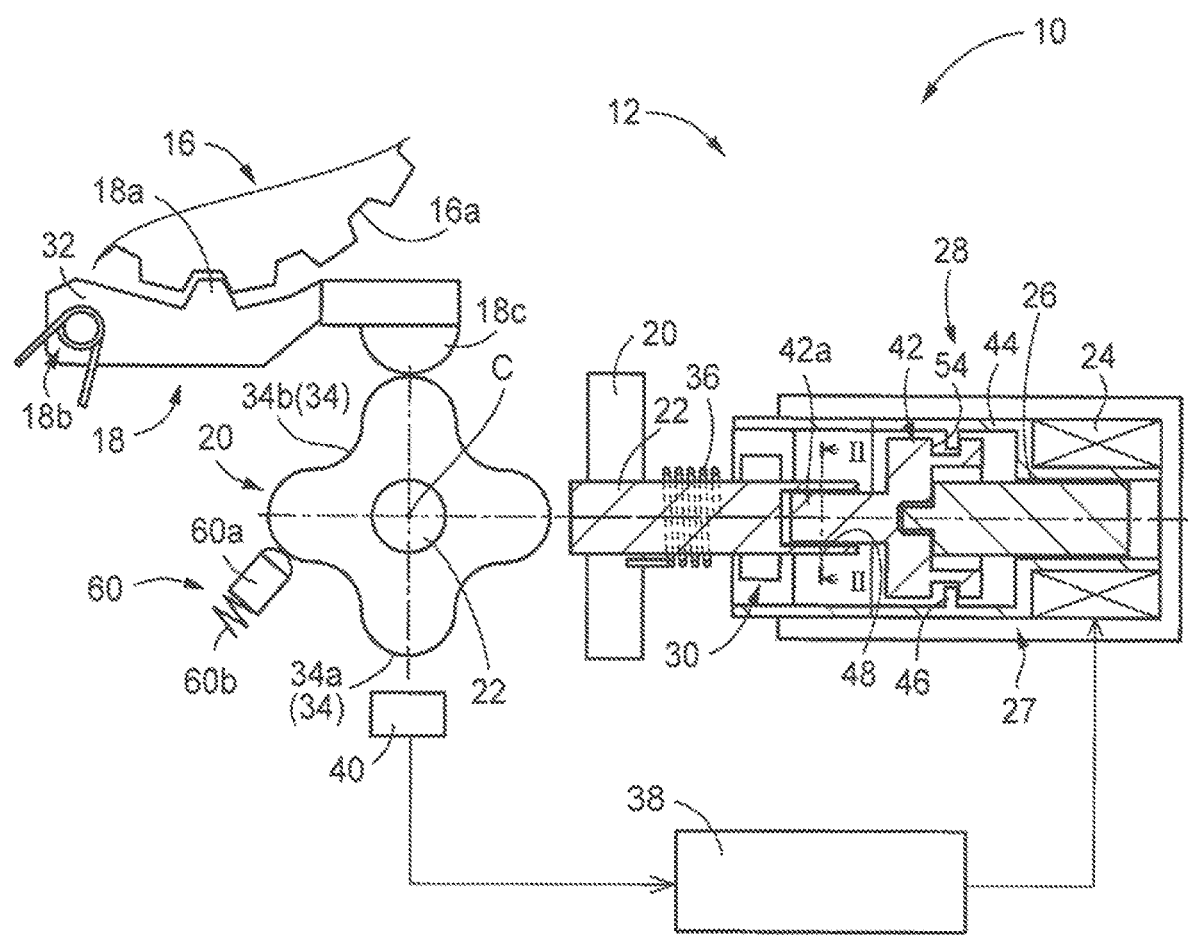
FIG. 1 is a view for illustrating an overall configuration of a parking lock device which is provided in a vehicle, and to which the disclosure is applied.

FIG. 1 is a view for illustrating an overall configuration of a parking lock device 12 which is provided in a vehicle 10, and to which the disclosure is applied. In FIG. 1, a drawing on a right side corresponds to a cross-sectional view for illustrating an internal structure of the parking lock device 12, and a drawing on a left side thereof corresponds to a view in which a parking cam 20 and a shaft 22, which will be described later, are seen in an axial direction of the shaft 22. The parking lock device 12 is a mechanism that stops the vehicle 10 by stopping rotation of a parking gear 16, which is coupled to unillustrated drive wheels in a manner capable of transmitting power and will be described later, at the time when a shift operation position is switched to a parking position (a P position) as a vehicle stop position, for example.

The parking lock device 12 is configured to include: the parking gear 16 that is coupled to the drive wheels in the manner capable of transmitting the power; a parking pawl 18 that is provided with a meshing projection portion 18a capable of meshing with the parking gear 16; the parking cam 20 that causes rotation of the parking pawl 18; the shaft 22 that causes rotation of the parking cam 20; a solenoid actuator 27 constructed of a solenoid 24 and a plunger 26; a power conversion mechanism 28 that converts translational motion of the plunger 26 to rotary motion and transmits the rotary motion to the shaft 22; and a one-way clutch 30 that inhibits reverse rotation of the shaft 22.

The parking gear 16 is coupled to the drive wheels in the manner capable of transmitting the power. When the rotation of the parking gear 16 is stopped, the vehicle 10 is stopped. On an outer circumferential portion of the parking gear 16, meshing recessed portions 16a, each of which can mesh with the meshing projection portion 18a of the parking pawl 18, are provided at fixed intervals.

The parking pawl 18 is provided in an elongated shape and is configured to be rotatable about a rotating portion 18b provided on one end side in a longitudinal direction. In an assembled state, in a portion of the parking pawl 18 on a side opposing the parking gear 16, the meshing projection portion 18a that can mesh with one of the meshing recessed portions 16a of the parking gear 16 is provided. In FIG. 1, when the parking pawl 18 rotates counterclockwise about the rotating portion 18b, one of the meshing recessed portions 16a of the parking gear 16 and the meshing projection portion 18a of the parking pawl 18 mesh with each other, and thereby stop the rotation of the parking gear 16. Meanwhile, in FIG. 1, when the parking pawl 18 rotates clockwise about the rotating portion 18b, meshing between one of the meshing recessed portions 16a of the parking gear 16 and the meshing projection portion 18a of the parking pawl 18 is canceled. A position of the parking pawl 18 (a rotational position) where one of the meshing recessed portions 16a of the parking gear 16 and the meshing projection portion 18a of the parking pawl 18 mesh with each other is defined as a locked position of the parking pawl 18. In addition, a position of the parking pawl 18 (a rotational position) where the meshing between one of the meshing recessed portions 16a of the parking gear 16 and the meshing projection portion 18a of the parking pawl 18 is canceled is defined as an unlocked position of the parking pawl 18.

The rotating portion 18b is provided with a torsion spring 32. The torsion spring 32 urges the parking pawl 18 in a clockwise direction in FIG. 1, that is, a direction in which the meshing between one of the meshing recessed portions 16a of the parking gear 16 and the meshing projection portion 18a of the parking pawl 18 is canceled. The parking pawl 18 is further provided with an abutment portion 18c that abuts a cam surface 34, which will be described below, in the parking cam 20.

The parking cam 20 is formed in a disc shape and is configured to be rotatable about a rotation axis C. On an outer circumferential portion of the parking cam 20, the cam surface 34 abuts (slidingly contacts) the abutment portion 18c of the parking pawl 18. In FIG. 1, as shown in the drawing in which the parking cam 20 is seen in the axial direction of the shaft 22, the cam surface 34 includes a smooth curved surface shape that continues in a circumferential direction. In detail, the cam surface 34 includes four ridge surfaces 34a, each of which is projected radially outward from the rotation axis C, and four trough surfaces 34b, each of which is recessed radially inward. These ridge surfaces 34a and trough surfaces 34b are alternately provided in the circumferential direction. Here, the ridge surface 34a is an example of the first surface in the disclosure, and the trough surface 34b is an example of the second surface in the disclosure.

When the parking cam 20 rotates, a position of the cam surface 34, which abuts the abutment portion 18c of the parking pawl 18, is changed. In this way, the rotational position of the parking pawl 18 is changed. For example, as shown in FIG. 1, when the abutment portion 18c of the parking pawl 18 abuts an apex portion of one of the ridge surfaces 34a of the cam surface 34, the parking pawl 18 rotates the most in a counterclockwise direction against an urging force of the torsion spring 32. At this time, one of the meshing recessed portions 16a of the parking gear 16 and the meshing projection portion 18a of the parking pawl 18 mesh with each other. That is, the parking pawl 18 moves to the locked position. Meanwhile, when the abutment portion 18c of the parking pawl 18 abuts a nadir of one of the trough surfaces 34b of the cam surface 34, the parking pawl 18 rotates the most in a clockwise direction. At this time, the meshing between one of the meshing recessed portions 16a of the parking gear 16 and the meshing projection portion 18a of the parking pawl 18 is canceled. That is, the parking pawl 18 moves to the unlocked position.

Accordingly, in the state where the abutment portion 18c of the parking pawl 18 abuts the apex portion of one of the ridge surfaces 34a of the cam surface 34, when the parking cam 20 rotates in one direction (for example, the counterclockwise direction), and the abutment portion 18c abuts the nadir portion of one of the trough surfaces 34b, the meshing between one of the meshing recessed portions 16a of the parking gear 16 and the meshing projection portion 18a of the parking pawl 18 is canceled. Due to this cancellation, the parking pawl 18 is switched to be located at the unlocked position. Furthermore, in the state where the abutment portion 18c abuts the nadir portion of one of the trough surfaces 34b, when the parking cam 20 rotates in the one direction, and the abutment portion 18c abuts the apex portion of one of the ridge surfaces 34a, one of the meshing recessed portions 16a of the parking gear 16 and the meshing projection portion 18a of the parking pawl 18 mesh with each other. Due to this meshing, the parking pawl 18 is switched to be located at the locked position. Moreover, since the ridge surfaces 34a and the trough surfaces 34b of the cam surface 34 are alternately provided in the circumferential direction, the position where the abutment portion 18c abuts the cam surface 34 is alternately switched between the ridge surfaces 34a and the trough surfaces 34b according to the rotation of the parking cam 20 in the one direction. That is, the parking pawl 18 is configured to be alternately switchable between the locked position and the unlocked position according to the position of the cam surface 34, which abuts the abutment portion 18c, when the parking cam 20 rotates in the one direction.

The shaft 22 is inserted through an inner circumference of the parking cam 20. The parking cam 20 and the shaft 22 can rotate relative to each other, and a torsion spring 36 is interposed between the parking cam 20 and the shaft 22. One end of the torsion spring 36 is connected to the parking cam 20, and the other end thereof is connected to the shaft 22. Accordingly, the rotation of the shaft 22 is transmitted to the parking cam 20 via the torsion spring 36. Accordingly, in a transition period when the parking pawl 18 rotates counterclockwise to cause the meshing projection portion 18a to mesh with one of the meshing recessed portions 16a, even in the case where a tooth tip of the meshing projection portion 18a abuts a projected portion formed between the adjacent meshing recessed portions 16a, the parking cam 20 is urged in a direction in which one of the meshing recessed portions 16a and the meshing projection portion 18a mesh with each other due to an elastic restoring force of the torsion spring 36. Accordingly, when the parking gear 16 rotates, and abutment between a tooth tip of one of the meshing recessed portions 16a and the tooth tip of the meshing projection portion 18a is canceled, the parking cam 20 rotates quickly by the elastic restoring force of the torsion spring 36, the meshing projection portion 18a meshes with one of the meshing recessed portions 16a, and the rotation of the parking gear 16 is stopped. The shaft 22 rotates by power transmitted from the power conversion mechanism 28, which will be described later.

The solenoid actuator 27 is configured to include the solenoid 24 and the plunger 26 arranged on an inner circumference of the solenoid 24. The solenoid actuator 27 causes the translational motion (reciprocal motion) of the columnar plunger 26, which is provided on the inner circumference of the solenoid 24, in the axial direction when energizing the solenoid 24. For example, when a current in one direction is generated on a coil constituting the solenoid 24, a magnetic force is exerted on the plunger 26. As a result, the plunger 26 moves to one side in the axial direction. Meanwhile, a current in a reverse direction is generated in the coil, the plunger 26 moves to the other side in the axial direction. Accordingly, the plunger 26 reciprocates in the axial direction when the direction of the current through the solenoid 24 is continuously switched. Here, because the shaft 22 and the plunger 26 are arranged in alignment on the same rotation axis, the axial direction of the shaft 22 and the axial direction of the plunger 26 mean the same direction. Hereinafter, the axial direction will mean the axial direction of the shaft 22 and the plunger 26 unless otherwise noted.

The current through the solenoid 24 is controlled by an electronic control unit 38. The electronic control unit 38 is configured to include a so-called microcomputer including a CPU, RAM, ROM, an input/output interface, and the like, for example. The CPU executes signal processing according to a program stored in the ROM in advance while using a temporary storage function of the RAM, so as to control an actuation state of the parking lock device 12. The electronic control unit 38 receives a signal, which indicates a rotational position of the parking cam 20 detected by a rotation angle sensor 40, for example, and the like. Meanwhile, based on the detected rotational position of the parking cam 20, the electronic control unit 38 outputs a command signal (a drive current) that makes the parking cam 20 rotate to a specified rotational position corresponding to the shift operation position.

Between the plunger 26 and the shaft 22, the power conversion mechanism 28 is provided to convert the reciprocal motion of the plunger 26 to the rotary motion in one direction and transmit the rotary motion in the one direction to the shaft 22. The power conversion mechanism 28 is configured to include: a cam member 42 that reciprocates in the axial direction in an interlocking manner with the reciprocal motion of the plunger 26; and a projection 46 that is projected toward the cam member 42 side (an inner circumferential side) from an inner circumferential wall of a cylindrical sleeve 44 that accommodates the cam member 42. The projection 46 is formed in a columnar shape, and the plural (four in this embodiment) projections 46 are provided at equally spaced intervals in the circumferential direction of the sleeve 44.

The cam member 42 is provided to be movable in the axial direction and rotatable about the rotation axis C in the sleeve 44. A portion on one side in the axial direction of the cam member 42 is connected to one end of the plunger 26 in the axial direction by screwing. Thus, the cam member 42 moves in the axial direction in the interlocking manner with the plunger 26. A portion on the other side in the axial direction of the cam member 42 is provided with a columnar shaft portion 42a. The shaft 22 is connected to a tip of this shaft portion 42a in a manner incapable of making the relative rotation thereto and capable of making relative movement in the axial direction.

Figure 2:
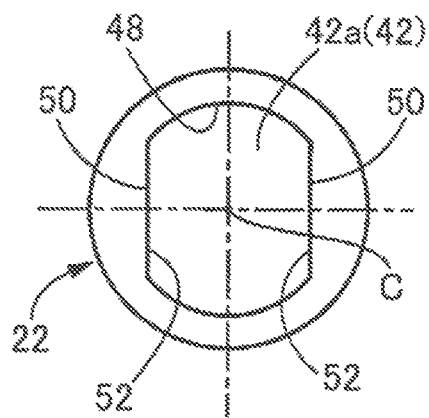
FIG. 2 is a cross-sectional view of a connected portion between a shaft and a cam member that is taken along cutout line II-II in FIG. 1.

FIG. 2 is a cross-sectional view of a connected portion between the shaft 22 and the cam member 42 (the shaft portion 42a) that is taken along cutout line II-II. As shown in FIG. 2, An axial hole 48, in which the shaft portion 42a of the cam member 42 is inserted, is provided at one end in the axial direction of the shaft 22. A depth of the axial hole 48 is set to be in a range where a hole bottom of the axial hole 48 does not contact a tip of the shaft portion 42a regardless of a position of the cam member 42 in the axial direction. That is, the depth of the axial hole 48 is set to be in the range where the shaft 22 does not move in the axial direction by the movement of the cam member 42 in the axial direction.

As shown in FIG. 2, a pair of notches 50 are provided on an outer circumferential surface of the shaft portion 42a of the cam member 42. The pair of notches 50 are formed to be parallel with each other. The axial hole 48 is formed with a pair of parallel surfaces 52 that are respectively fitted to the pair of notches 50. The pair of parallel surfaces 52 are also formed to be parallel with each other. During assembly of the shaft 22 and the cam member 42, the shaft portion 42a of the cam member 42 is inserted in the axial hole 48 of the shaft 22 such that the notches 50 and the parallel surfaces 52 are brought into contact states. As a result, the relative rotation between the shaft 22 and the cam member 42 is inhibited while the relative movement between the shaft 22 and the cam member 42 is permitted.

Figure 3:
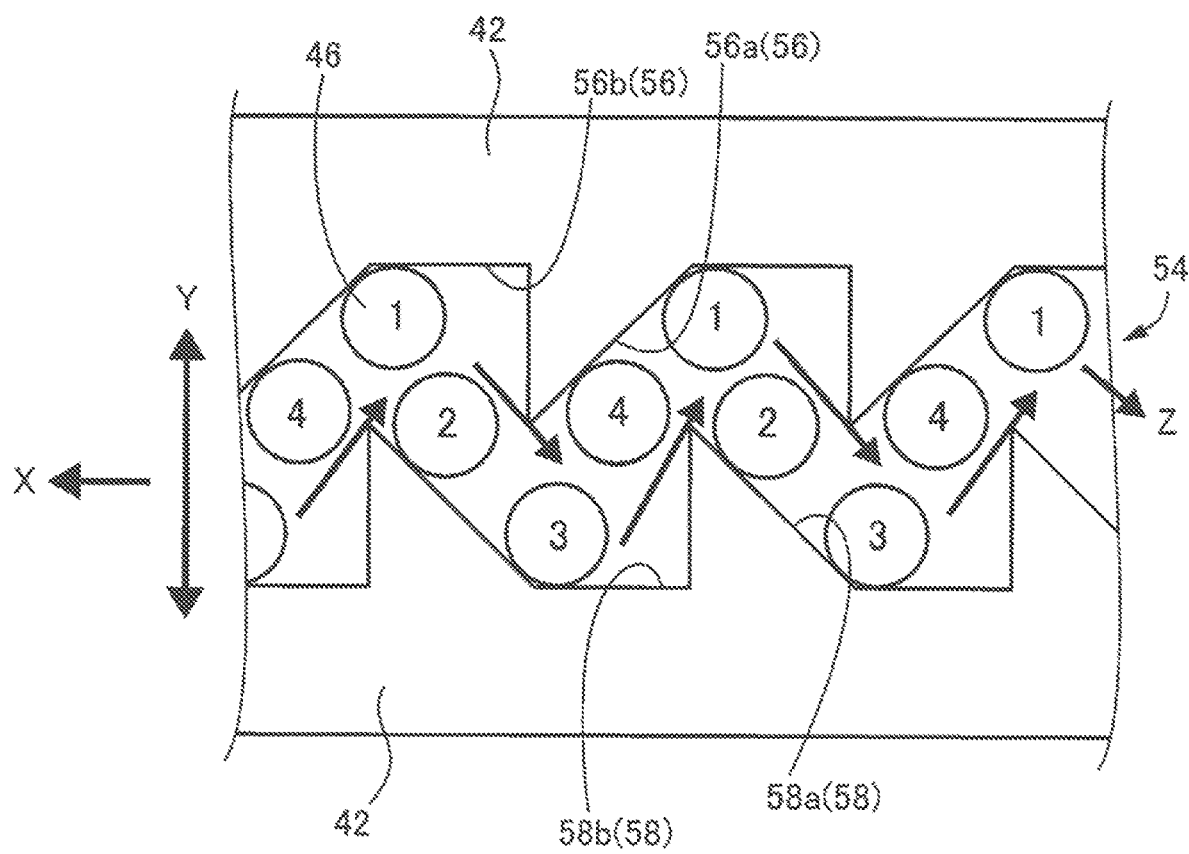
FIG. 3 is a development view in which a portion of the cam member provided with a cam groove shown in FIG. 1 is cut along a circumferential direction and is developed in a plane.

In a portion of the cam member 42 that opposes the inner circumferential wall of the sleeve 44, a cam groove 54 that is engaged with the projection 46 of the sleeve 44 is provided. FIG. 3 is a development view in which the portion of the cam member 42 provided with the cam groove 54 shown in FIG. 1 is cut along the circumferential direction and is developed in a plane. Although FIG. 3 only shows a part of the cam groove 54 in the circumferential direction, the actual cam groove 54 is formed in an endless ring shape that is changed at fixed intervals in the circumferential direction.

In FIG. 3, a right-left direction of the sheet corresponds to the circumferential direction of the cam member 42. In FIG. 3, an up-down direction of the sheet corresponds to the axial direction of the shaft 22 and the plunger 26 in FIG. 1. Circular members, which are shown in FIG. 3 and are denoted by the numbers therein, each indicates the projection 46 projected to the inner circumferential side from the inner circumferential wall of the sleeve 44. In FIG. 3, the plural projections 46 are illustrated. However, these plural projections 46 represent a trajectory of the single projection 46. More specifically, the projection 46 moves in the cam groove 54 in an order of the denoted numbers (1→2→3→4→1). In FIG. 3, the projection 46 moves in the cam groove 54 as indicated by an arrow Z. However, the projection 46 is fixed to the sleeve 44 in the manner incapable of moving. Thus, the cam member 42 actually rotates in one direction indicated by an arrow X while reciprocating in the axial direction indicated by an arrow Y.

As shown in FIG. 3, the cam groove 54 is configured to include: a first cam surface 56 provided on the parking cam 20 side in the axial direction; and a second cam surface 58 provided on the solenoid 24 side in the axial direction in FIG. 1. Each of the first cam surface 56 and the second cam surface 58 has a shape that is changed at fixed intervals in the circumferential direction. The first cam surface 56 is configured that first inclined surfaces 56a and first flat surfaces 56b are alternately arranged. The first inclined surface 56a is inclined toward the second cam surface 58 side (a lower side of the sheet) as advancing in the arrow X direction (a left side in the sheet) in FIG. 3. The second cam surface 58 is configured that second inclined surfaces 58a and second flat surfaces 58b are alternately arranged. The second inclined surface 58a is inclined toward the first cam surface 56 side (an upper side of the sheet) as advancing in the arrow X direction in FIG. 3. Note that the first inclined surface 56a and the second inclined surface 58a are an example of the inclined surface in the disclosure.

FIGS. 4A, 4B, 4C, and 4D show states of the power conversion mechanism 28 corresponding to positions of the numbers added to the projection 46 in FIG. 3. That is, in each of the FIGS. 4A, 4B, 4C, and 4D, the state of the power conversion mechanism 28 at the time when the projection 46 in FIG. 3 is located at the position with the corresponding number is shown. An upper portion of FIGS. 4A, 4B, 4C, and 4D include perspective views, in each of which the inside of the sleeve 44 is seen through, and a lower portion thereof includes cross-sectional views, in each of which the power conversion mechanism 28 shown in the upper portion is cut at a position including the projection 46.

Figure 4:
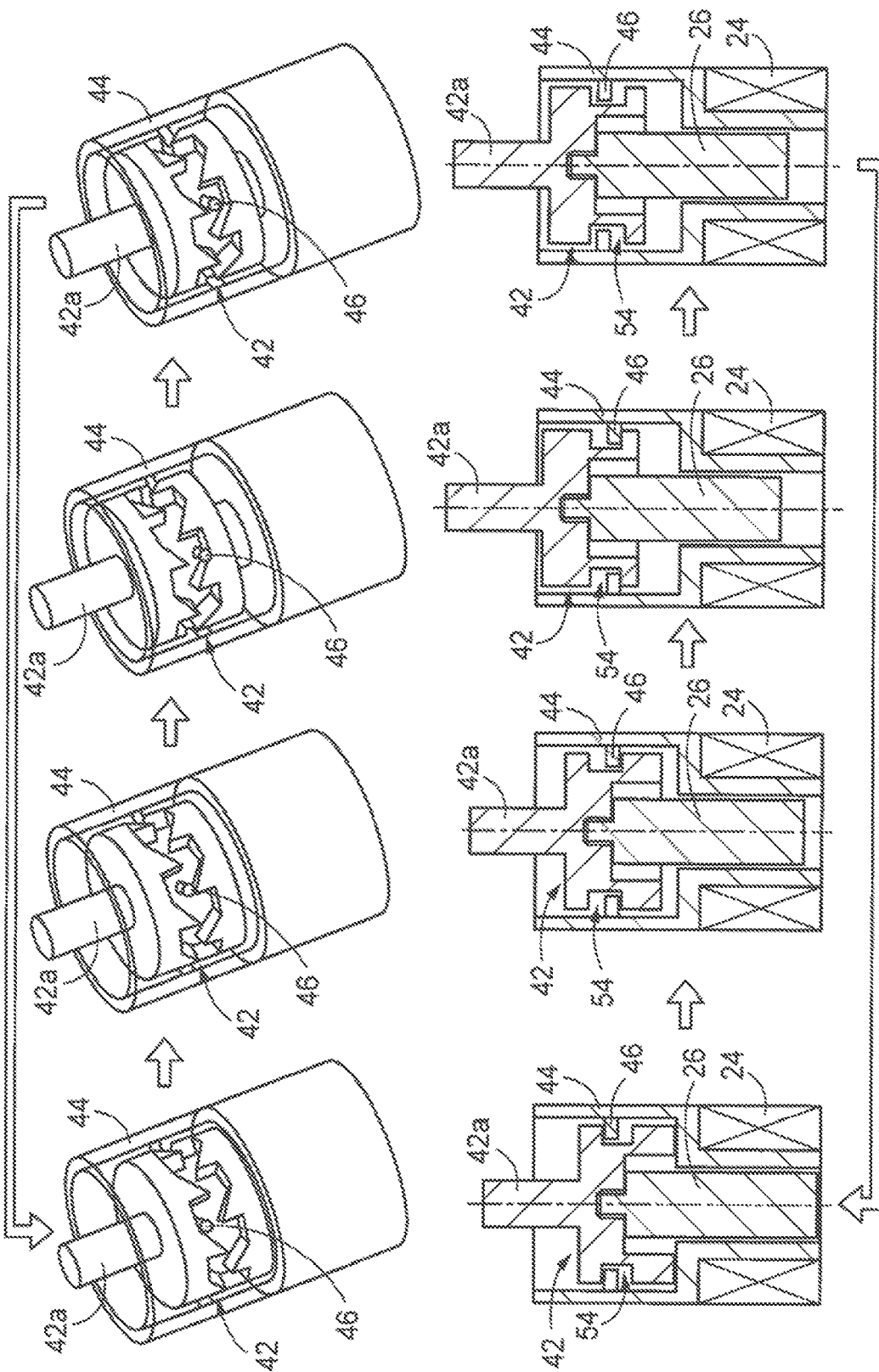
FIG. 4A is a view of state of a power conversion mechanism corresponding to position of number 1 added to a projection in FIG. 3.
FIG. 4B is a view of state of a power conversion mechanism corresponding to position of number 2 added to the projection in FIG. 3.
FIG. 4C is a view of state of a power conversion mechanism corresponding to position of number 3 added to the projection in FIG. 3.
FIG. 4D is a view of state of a power conversion mechanism corresponding to position of number 4 added to the projection in FIG. 3.

For example, when the projection 46 is located at the number 1 in FIG. 3, the power conversion mechanism 28 is in a state shown in FIG. 4A. In a state where the projection 46 is located at the number 1 in FIG. 3, as shown in FIG. 4A, the plunger 26 and the cam member 42 are located on the lowest side of the sheet (the solenoid 24 side in the axial direction).

When the solenoid 24 is energized in this state, the cam member 42 moves to the upper side of the sheet in FIG. 3. At this time, like the projection 46 in the number 2 in FIG. 3, the projection 46 abuts the second inclined surface 58a, and the projection 46 further moves to the position in the number 3 along the second inclined surface 58a. The above situation will be described with reference to FIGS. 4A, 4B, 4C, and 4D. When the cam member 42 moves from the state shown in FIG. 4A, as shown in FIG. 4B, the projection 46 abuts the second inclined surface 58a, and the projection 46 further moves along the second inclined surface 58a. Then, the projection 46 moves to the position shown in FIG. 4C. Here, in a transition period in which the state is switched from the state shown in FIG. 4B to the state shown in FIG. 4C, the second inclined surface 58a is pressed against the projection 46, and thus, due to a reaction force generated between the second inclined surface 58a and the projection 46, the cam member 42 rotates clockwise (in the arrow X direction in FIG. 3) when seen from the shaft portion 42a side.

Next, when the solenoid 24 is energized in the reverse direction from the state where the projection 46 reaches the position in the number 3, the cam member 42 moves to the lower side of the sheet in FIG. 3. At this time, like the projection 46 in the number 4 in FIG. 3, the projection 46 abuts the first inclined surface 56a, and the projection 46 further moves along the first inclined surface 56a. In this way, the projection 46 moves to the position in the number 1. That is, the projection 46 returns to the same state as the state in the number 1. The above situation will be described with reference to FIGS. 4A, 4B, 4C, and 4D. When the cam member 42 moves from the state shown in FIG. 4C, as shown in FIG. 4D, the projection 46 abuts the first inclined surface 56a, and the projection 46 further moves along the first inclined surface 56a. In this way, the projection 46 moves to the state shown in FIG. 4A. Here, in a transition period in which the state is switched from the state shown in FIG. 4D to the state shown in FIG. 4A, the first inclined surface 56a is pressed against the projection 46, and thus, due to a reaction force generated between the first inclined surface 56a and the projection 46, the cam member 42 rotates clockwise (in the arrow X direction in FIG. 3) when seen from the shaft portion 42a side.

Just as described, when the cam member 42 reciprocates in the arrow Y direction in FIG. 3 (the axial direction of the plunger 26 in FIGS. 4A, 4B, 4C, and 4D), the projection 46 moves in the order of the number 1 to the number 4 and then returns to the state in the number 1. At this time, the projection 46 moves along the first inclined surface 56a and the second inclined surface 58a while abutting these inclined surfaces 56a, 58a. In this way, the cam member 42 rotates in the one direction. Thus, the reciprocal motion of the cam member 42 is converted to the rotary motion of the cam member 42 by the power conversion mechanism 28.

The shaft 22 is provided with the one-way clutch 30 that restricts the rotational direction of the shaft 22 to the one direction, that is, inhibits the rotation thereof in the reverse rotational direction. In addition, since the parking cam 20 is connected to the shaft 22 in the manner incapable of making the relative rotation, the rotation of the parking cam 20 in the reverse rotational direction is inhibited by the one-way clutch 30. In this way, the shaft 22 and the parking cam 20 always rotate in the one direction (the arrow X direction in FIG. 3). Thus, the reverse rotation of the shaft 22 and the parking cam 20 is inhibited.

In addition, a cam fixing mechanism 60 that abuts the parking cam 20 is provided. The cam fixing mechanism 60 is constructed of: a cam fixing plunger 60a that abuts the cam surface 34 of the parking cam 20; and a spring 60b that urges the cam fixing plunger 60a to the cam surface 34. In the cam fixing mechanism 60, the cam fixing plunger 60a abuts the parking cam 20 in a state where the parking cam 20 does not rotate, that is, a state where the solenoid 24 is not energized. In this way, the cam fixing mechanism 60 urges the parking cam 20 in the reverse direction, that is, the reverse direction from the arrow X in FIG. 3. In the case where the cam fixing mechanism 60 urges the parking cam 20 in a reverse rotational direction and thus the solenoid 24 is not energized, the rotational position of the parking cam 20 is fixed. Note that, in the cam fixing mechanism 60, the position of the cam fixing plunger 60a that abuts the cam surface 34, rigidity of the spring 60b, and the like are set such that the cam fixing plunger 60a does not interfere during the rotation of the parking cam 20, more specifically, a load that inhibits the rotation of the parking cam 20 by the cam fixing plunger 60a (rotation resistance) during the rotation of the parking cam 20 is minimized.

In the parking lock device 12 that is configured as described above, for example, when the shift operation position is switched to the P position, the electronic control unit 38 outputs the command signal, which causes the parking cam 20 to rotate to the rotational position corresponding to the P position, to the solenoid 24. Note that the rotational position corresponding to the P position corresponds to the position where one of the meshing recessed portions 16a of the parking gear 16 and the meshing projection portion 18a of the parking pawl 18 mesh with each other, more specifically, the position where the apex portion of one of the ridge surfaces 34a in the parking cam 20 abuts the abutment portion 18c of the parking pawl 18. Based on a difference between the rotational position of the parking cam 20 detected by the rotation angle sensor 40 and the rotational position corresponding to the P position of the parking cam 20, the electronic control unit 38 outputs the command signal such that the parking cam 20 reaches the rotational position corresponding to the P position. More specifically, the electronic control unit 38 causes the energization in a manner that a direction of the drive current for the solenoid 24 is continuously switched. In this way, the electronic control unit 38 causes the reciprocal motion of the plunger 26 for the number of times for the parking cam 20 to reach the rotational position corresponding to the P position.

Due to the reciprocal motion of the plunger 26, the cam member 42, which reciprocates in the interlocking manner with the plunger 26, rotates in the one direction via the power conversion mechanism 28. In addition, since the shaft 22 is connected to the cam member 42 in the manner incapable of making the relative rotation, the shaft 22 and the cam member 42 rotate integrally. At this time, the reverse rotation of the shaft 22 is reliably inhibited by the one-way clutch 30. When the shaft 22 rotates in the one direction, the parking cam 20, which is connected thereto via the torsion spring 36, rotates to the rotational position corresponding to the P position. In this way, one of the meshing recessed portions 16a of the parking gear 16 and the meshing projection portion 18a of the parking pawl 18 mesh with each other. Thus, the rotation of the parking gear 16 is stopped.

In addition, in the case where the shift operation position is switched from the P position to the position other than the P position, the electronic control unit 38 outputs the command signal, which causes the parking cam 20 to rotate to the rotational position where the meshing between one of the meshing recessed portions 16a of the parking gear 16 and the meshing projection portion 18a of the parking pawl 18 is canceled, that is, the rotational position where the nadir of the trough surfaces 34b of the parking cam 20 abuts the abutment portion 18c of the parking pawl 18, to the solenoid 24. In this way, the parking cam 20 rotates to the rotational position. At this time, the torsion spring 32 urges the parking pawl 18 in the direction in which the meshing between one of the meshing recessed portions 16a of the parking gear 16 and the meshing projection portion 18a of the parking pawl 18 is canceled. Thus, the meshing between these meshing recessed portions 16a and meshing projection portion 18a is canceled.

Meanwhile, in the state where the shift operation position is not switched, the solenoid 24 is not energized. At this time, the reverse rotation of the shaft 22 is inhibited by the one-way clutch 30, and the cam fixing mechanism 60 urges the parking cam 20 in the reverse rotational direction. Thus, the rotation of the parking cam 20 is inhibited. For such a reason, a detent mechanism (a moderation mechanism) for stopping the rotation of the parking cam 20 in the state where the solenoid 24 is not energized does not have to be separately provided.

Just as described, when the solenoid 24 is energized, the reciprocal motion (the translational motion) of the plunger 26 and the cam member 42 is converted to the rotary motion of the parking cam 20 via the power conversion mechanism 28, and the actuation state of the parking lock device 12 is switched. Here, even in the case where a stroke amount of the plunger 26 is small, the rotation angle of the parking cam 20 can be increased by repeating the reciprocal motion of the plunger 26. Accordingly, the parking lock device 12 can be configured in small size, and thus mountability thereof on the vehicle 10 is improved. In addition, since the solenoid 24 is used as a drive source that drives the parking cam 20, an electric circuit is simplified in comparison with a case where the parking cam 20 is driven by an electric motor. Thus, manufacturing cost is reduced.

As described above, according to this embodiment, it is configured that the reciprocal motion of the plunger 26 is converted to the rotation of the parking cam 20 in the one direction via the power conversion mechanism 28, and, when the parking cam 20 rotates in the one direction, the position of the cam surface 34 of the parking cam 20, which abuts the parking pawl 18, is changed to alternately switch the parking pawl 18 between the locked position and the unlocked position. In this way, the parking lock device 12 can be configured in the small size by reducing the stroke amount of the plunger 26 to be small in such a range where the parking cam 20 can rotate. Therefore, the mountability of the parking lock device 12 on the vehicle is improved.

In addition, according to this embodiment, when the plunger 26 reciprocates, the first and second inclined surfaces 56a, 58a formed in the cam groove 54 of the cam member 42 abut the projection 46, and the cam member 42 rotates in the one direction by the reaction force generated in the abutment portion between the first and second inclined surfaces 56a, 58a of the cam groove 54 and the projection 46. Accordingly, the reciprocal motion of the plunger 26 can be converted to the rotation of the cam member 42 in the one direction. Furthermore, since the ridge surfaces 34a and the trough surfaces 34b of the cam surface 34 are alternately provided in the circumferential direction, the parking pawl 18 can alternately be switched between the locked position and the unlocked position by the rotation of the parking cam 20 in the one direction. Moreover, since the rotation of the parking cam 20 in the reverse direction is inhibited by the one-way clutch 30 and the cam fixing mechanism 60 urges the parking cam 20 in the reverse rotational direction, the rotation of the parking cam 20 in the state where the solenoid 24 is not energized can be suppressed.

The embodiment of the disclosure has been described so far in detail on the basis of the drawings. The disclosure can also be applied to other aspects.

Figure 5:
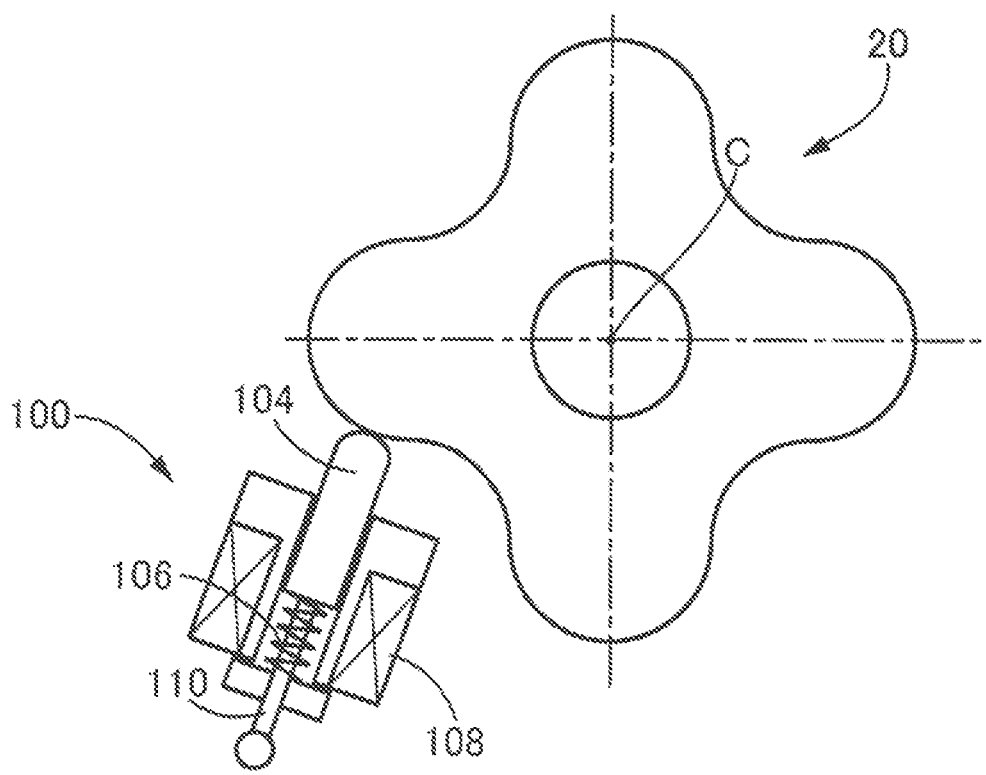
FIG. 5 is a view of another example of the cam fixing mechanism shown in FIG. 1.

For example, in the above-described embodiment, the spring 60b of the cam fixing mechanism 60 urges the cam fixing plunger 60a toward the cam surface 34. However, a structure of the cam fixing mechanism 60 is not necessarily limited thereto. For example, like a cam fixing mechanism 100 shown in FIG. 5, the cam fixing mechanism 60 may be configured to include a solenoid 108. The cam fixing mechanism 100 shown in FIG. 5 is configured to include, a cam fixing plunger 104, a spring 106 that urges the cam fixing plunger 104 toward the parking cam 20, and the solenoid 108. In a state where the solenoid 108 is not energized, the cam fixing plunger 104 abuts the parking cam 20 by an urging force of the spring 106, and the rotation of the parking cam 20 is thereby inhibited. Meanwhile, it is configured that, when the solenoid 108 is energized, the cam fixing plunger 104 moves in a direction away from the parking cam 20 against the urging force of the spring 106 and the rotation of the parking cam 20 is thereby permitted. In this way, the solenoid 108 is energized during the rotation of the parking cam 20. Thus, the abutment between the parking cam 20 and the cam fixing plunger 104 is canceled, and rotation resistance that is applied to the parking cam 20 by the cam fixing mechanism 100 during the rotation of the parking cam 20 is suppressed. In addition, as shown in FIG. 5, a coupling rod 110 that is connected to the cam fixing plunger 104 and can cancel the abutment between the parking cam 20 and the cam fixing plunger 104 by manual operation may be provided. Note that the coupling rod 110 may be provided in the cam fixing mechanism 60 in the above-described embodiment.

In the above-described embodiment, the rotational position of the parking cam 20 is detected by the rotation angle sensor 40. However, a stroke sensor that detects a stroke position of the cam fixing plunger 60a in the cam fixing mechanism 60 may be provided, and the rotational position of the parking cam 20 may be calculated on the basis of the stroke position of the cam fixing plunger 60a, which is detected by the stroke sensor.

In the above-described embodiment, the cam surface 34 of the parking cam 20 is provided with the four ridge surfaces 34a and the four trough surfaces 34b. However, the number of the ridge surfaces 34a and the number of the trough surfaces 34b may not be limited thereto. That is, the number of the ridge surfaces 34a and the number of the trough surfaces 34b can appropriately be changed within the range where the ridge surfaces 34a and the trough surfaces 34b are alternately provided in the circumferential direction.

In the above-described embodiment, the pair of the notches 50 is formed in the shaft portion 42a of the cam member 42, and the pair of the parallel surfaces 52 is provided in the axial hole 48 of the shaft 22. In this way, the relative rotation between the cam member 42 and the shaft 22 is inhibited. However, the notches 50 and the parallel surfaces 52 can appropriately be changed within the range where the relative rotation between the cam member 42 and the shaft 22 is inhibited. For example, the shaft portion 42a may be formed to have a square cross-sectional shape, and the axial hole 48 may be formed to have a square cross-sectional shape so as to correspond to the cross-sectional shape of the shaft portion 42a. In addition, the shaft portion 42a and the shaft 22 may be connected to each other by spline-fitting.

In the above-described embodiment, the direction of the drive current for the solenoid 24 is continuously switched, and the plunger 26 thereby reciprocates. However, in the parking lock device 12, a spring that urges the plunger 26 in one direction of the axial direction may be added, and thus the movement of the plunger 26 in the one direction may be caused by the spring. In such a case, in the solenoid 24, the energization and the stop of the energization of the drive current in the one direction are repeated. As a result, the plunger 26 reciprocates.

In the above-described embodiment, instead of the cam fixing mechanism 60, the detent mechanism (the moderation mechanism) may be provided to urge the parking cam 20 in such a manner as to keep the parking cam 20 at the specified rotational position. As a structure of the detent mechanism, for example, such a structure is applied that plural recesses are provided in the parking cam 20 or the shaft 22 in the circumferential direction and a ball urged by a spring is pressed against one of the recesses.

In the above-described embodiment, a roller that is configured to be rotatable may be provided on the abutment portion 18c of the parking pawl 18, and this roller and the cam surface 34 of the parking cam 20 may contact each other. Alternatively, the roller may be provided on each of the ridge surfaces 34a of the cam surface 34. Just as described, when the roller is provided in one of the abutment portion 18c and the ridge surface 34a, slipping between the abutment portion 18c and the cam surface 34 is changed to rolling. Thus, the device can be downsized by reducing the power of the solenoid actuator 27, and the mountability of the device is further improved.

In the above-described embodiment, the projection 46 provided on the sleeve 44 may be constructed of the roller that can rotate.

In the above-described embodiment, in the parking pawl 18 shown in FIG. 1, the meshing projection portion 18a is provided in the counterclockwise direction with the rotating portion 18b being the center, and the abutment portion 18c is provided in the clockwise direction. However, the disclosure is not necessarily limited thereto. For example, the meshing projection portion 18a and the abutment portion 18c may be provided in the same direction with the rotating portion 18b being the center. That is, the disclosure can be applied to the configuration in which the meshing and the cancellation of the meshing between one of the meshing recessed portions 16a of the parking gear 16 and the meshing projection portion 18a of the parking pawl 18 are switched by the rotation of the parking cam 20.

In the above-described embodiment, the cam member 42 and the plunger 26 are connected by screwing. However, the connection method can appropriately be changed within the range where the cam member 42 and the plunger 26 are integrally connected. For example, the cam member 42 and the plunger 26 may be connected by welding.

What have been described so far merely constitutes one embodiment, and the disclosure can be implemented in aspects by making various modifications and improvements on the basis of knowledge of a person skilled in the art.

What is claimed is:

1. A parking lock device comprising:
   a parking gear;
   a parking pawl including a meshing projection portion that can mesh with the parking gear;
   a parking cam configured to be rotatable and including a cam surface which abuts the parking pawl on an outer circumferential portion of the parking cam;
   a solenoid actuator including a solenoid and a plunger and configured to cause reciprocation of the plunger by energizing the solenoid; and
   a power conversion mechanism comprising a cam member, the power conversion mechanism configured to convert reciprocal motion of the plunger to rotary motion of the parking cam in only one direction,
   wherein the parking lock device is configured to be switchable between a locked position and an unlocked position, at the locked position, the parking gear and the meshing projection portion of the parking pawl mesh with each other, so as to stop rotation of the parking gear, and, at the unlocked position, meshing between the parking gear and the meshing projection portion of the parking pawl is canceled, and
   wherein the parking lock device is configured to change a position of the cam surface, which abuts the parking pawl when the parking cam rotates and to be able to alternately switch the parking pawl between the locked position and the unlocked position according to the position of the cam surface, which abuts the parking pawl.

2. The parking lock device according to claim 1, wherein:
   the power conversion mechanism further includes a projection, the cam member being configured to reciprocate and be rotatable in an interlocking manner with the plunger, and the projection being projected toward the cam member from a sleeve that accommodates the cam member; and
   the cam member is provided with a cam groove that is engaged with the projection, the cam groove being provided with an inclined surface that causes rotation of the cam member in one direction when the cam member abuts the projection in conjunction with the reciprocal motion of the cam member.

3. The parking lock device according to claim 1, wherein in the cam surface of the parking cam, first surfaces and second surfaces are alternately provided in a circumferential direction, the first surface being configured that the parking gear and the meshing projection portion of the parking pawl mesh with each other in a state where the parking pawl abuts the first surface, and the second surface being configured that the meshing between the parking gear and the meshing projection portion of the parking pawl is canceled in a state where the parking pawl abuts the second surface.

4. The parking lock device according to claim 1, further comprising:
   a one-way clutch configured to inhibit rotation of the parking cam in a reverse direction of the parking cam; and
   a cam fixing mechanism configured to urge the parking cam in the reverse direction of the parking cam in a state where the solenoid is not energized.

5. The parking lock device according to claim 4, wherein the cam fixing mechanism includes a cam fixing plunger and a spring, the cam fixing plunger being configured to abut the cam surface of the parking cam, and the spring being configured to urge the cam fixing plunger to the cam surface.

6. The parking lock device according to claim 4, wherein the cam fixing mechanism includes a cam fixing plunger, a spring, and a cam fixing solenoid, the cam fixing plunger being configured to abut the cam surface of the parking cam, the spring being configured to urge the cam fixing plunger toward the parking cam, and the cam fixing solenoid being configured to cause the cam fixing plunger to move in a direction away from the parking cam against an urging force of the spring when the cam fixing solenoid is energized.

* * * * *